Oct. 23, 1956 R. S. MARSDEN, JR 2,768,266
ELECTRICAL NOISE ELEMENT
Filed April 9, 1951

INVENTOR.
R.S. MARSDEN, JR.
BY Hudson & Young
ATTORNEYS

United States Patent Office 2,768,266
Patented Oct. 23, 1956

2,768,266

ELECTRICAL NOISE ELEMENT

Ross S. Marsden, Jr., Bartlesville, Okla., assignor to Phillips Petroleum Company, a corporation of Delaware Application April 9, 1951, Serial No. 220,116

2 Claims. (Cl. 201—63)

This invention relates to electrical noise transducing elements. In another aspect it relates to methods of measuring high temperatures and detecting the presence of flames. In still another aspect it relates to methods of constructing electrical noise transducing elements.

In recent years it has become known that there exists within any electrical conductor a random statistical movement of electrical charges. This statistical movement of electrical charges is referred to generally as "thermal noise" since minute voltage fluctuations measured across the end terminals of a resistance element are directly proportional to the absolute temperature of said element. This relationship can be expressed mathematically by the Nyquist formula:

$$\overline{E^2} = 4kR_e(Z)T\Delta f \quad (1)$$

where $\overline{E^2}$ equals the mean-square voltage fluctuations across a resistance element, $\Delta f$ is the frequency band over which the voltage fluctuations are measured, $k$ is Boltzmann's gas constant, $R_e(Z)$ is a real part of the complex impedance of the element, and $T$ is the absolute temperature of the element. By using this relationship the temperature of a given first resistance element can be measured by comparing the voltage fluctuations generated across said first element with the voltage fluctuations generated across a second resistance element at known temperature. A system for measuring temperature utilizing this principle is described in the copending application of D. R. De Boisblanc and R. S. Marsden, Jr., Serial No. 220,115, filed April 9, 1951, now abandoned, in which the real parts of the impedance of the two networks under comparison are equalized leaving the equation $$\frac{\overline{E_1^2}}{\overline{E^2}} = \frac{T_1}{T_2} \quad (2)$$

which readily can be solved for the unknown temperature.

While the above mentioned thermal noise thermometer is valuable for high temperature measurements particularly in those temperature ranges in which satisfactory primary standards for comparison do not exist, for example, above approximately 1400° C.; considerable difficulty is encountered in constructing operable resistance elements for use in these high temperature ranges. Metallic resistors which may be used at lower temperatures are limited decidedly at these higher temperatures. In this noise thermometer the most satisfactory results have been obtained with a temperature indicating resistance element having a resistance of approximately 1,000 to 10,000 ohms. Since the thermal noise generated is directly proportional to resistance, it can be seen that low resistance elements produce very little measurable noise and, therefore, are not practical. Metallic resistors which are capable of withstanding high temperatures, for example: platinum, tungsten, or iridium, are relatively good electrical conductors, thus requiring that the element have very small cross section and a relatively great length in order to offer the desired ohmic resistance. It also should be noted that most metallic resistors are limited further by their tendency to oxidize, fuse, or emit electrons at high temperatures.

In addition to the thermal noise properties above described, it has been discovered that if a resistance element is positioned in the presence of an ion-producing reaction such as, for example, a flame, there will be generated across said element an electrical noise signal created by the ions striking the surface of said resistance element. This electrical signal, although similar to thermal noise, is not related directly to temperature but rather depends entirely upon ions striking said element; and, hence, can be used to detect the presence of an ion-producing reaction. Appropriate electrical circuitry for utilizing this phenomenon as a practical flame detector is disclosed in the copending application of D. R. De Boisblanc, Serial No. 220,113, filed April 9, 1951. This flame detector requires an electrical resistance noise element which will generate the desired electrical noise signal while at the same time is capable of withstanding the effect of high temperature flames impinging thereupon. Obviously, for the most part, metallic resistors do not meet these requirements.

In accordance with the present invention it has been discovered that various ceramic refractory materials can be used as thermal noise generating elements thereby giving excellent results, particularly important in temperature regions above approximately 1400° C. Indicating elements of these materials are much easier to fabricate than metals and are far cheaper to construct than metallic resistors capable of withstanding high temperatures. Suitable ceramic thermal noise generating elements having the desired resistance of approximately 1,000 to 10,000 ohms have been constructed for use in noise thermometers. These elements also have a fairly constant temperature coefficient of resistance over a particular temperature range under consideration, the latter being desirable but not essential to proper operation. Accordingly, this invention is directed primarily toward providing improved electrical noise elements for use in both high temperature noise thermometers and flame detectors.

It is, therefore, an object of this invention to provide electrical noise transducing elements capable of withstanding extremely high temperatures.

A further object is to provide electrical noise transducing elements rugged in construction, economical to manufacture, possessing desired electrical properties, and which operate in a satisfactory manner at high temperatures.

Various other objects and advantages and features of this invention should become apparent from the following detailed description taken in conjunction with the following detailed description taken in conjunction with the accompanying drawings in which.

Figure 1:
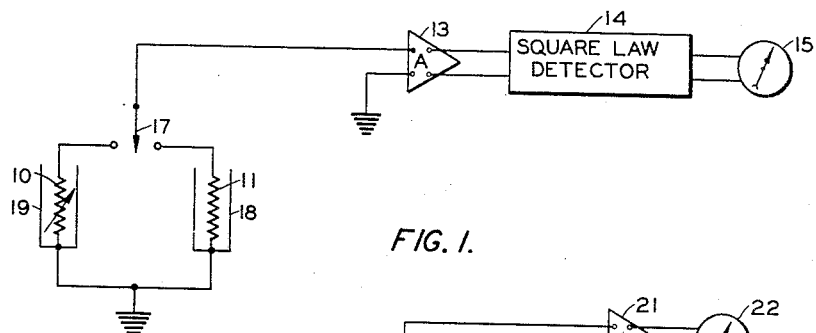
Figure 1 shows schematically an electrical circuit used for measuring high temperatures.
Figure 2:
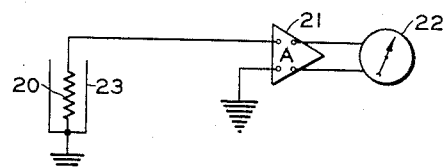
Figure 2 shows a simplified temperature measuring circuit which also can be used for flame detection.

Referring now to the drawings in detail and to Figures 1 and 2 in particular, there are shown simplified versions of the thermal noise thermometer circuits more fully described and claimed in the aforementioned De Boisblanc and Marsden application. In Figure 1 a reference variable resistance element 10 and an unknown resistance element 11 are connected alternately in circuit with amplifier 13, square law detector 14, and meter 15 by means of switch 17. Resistance element 10 is maintained at a known temperature while resistance element 11 is positioned at the unknown temperature being measured. In operating this thermometer the impedances of the two elements 10 and 11 first are equalized over a pre-selected frequency range by suitable means, not shown. This equalization can be accomplished by applying an alternating current voltage source of variable frequency across first one element and then the other. The corresponding voltage drop across each element is measured and the resistance of element 10 is adjusted until the two impedances are equalized over the pre-selected frequency range. Thermal noise voltage fluctuations generated across each element then are read on meter 15 which, due to the presence of square law detector 14, are proportional to the mean-square voltage fluctuation generated across each element. This ratio of these mean-square readings is substituted in Equation 2 to obtain the unknown temperature. In Figure 2 there is shown a simplified form of the noise thermometer shown in Figure 1. Thermal noise voltage fluctuations generated across element 20, which is positioned at the unknown temperature, are amplified by means of amplifier 21 and read on meter 22. This device does not give an absolute measurement of temperature, but rather, must be calibrated against known temperature over its useful range.

In order for the formula of Equation 1 to apply, the circuit under consideration must be passive, that is, no external current flow in said circuit can be tolerated. Thus, if one of the elements 10, 11, or 20 in Figures 1 and 2 is positioned in the region of an ion producing reaction such as a flame, then said elements must be shielded from the reaction by means of a suitable shield such as shown at 18, 19, or 23. The electrical circuitry of Figure 2, in addition to its use as a noise thermometer, can be employed as a flame detector by removing electrical shield 23. As such, electrical noise generated by the action of ions impinging upon element 20 is amplified and detected on a suitable meter 22. The operation of the circuit of Figure 2 as a flame detector is described more fully in the aforementioned application of De Boisblanc.

In Figures 3, 4, 5, 6, and 7 there are illustrated various forms of electrical noise transducing elements constructed in accordance with the present invention for use as detecting elements in the above described noise thermometer and flame detector circuits.

Figure 3:
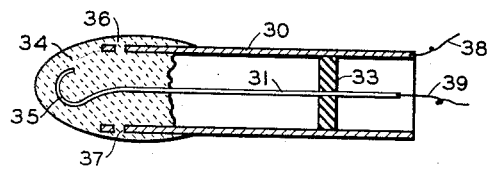
Figures 3, 4, 5, 6 and 7 show various forms of electrical noise transducing elements constructed in accordance with this invention.

Referring now to Figure 3 there is shown a noise sensing element comprising a cylindrically shaped metallic casing 30 having a metallic electrode 31 positioned therein and electrically insulated from said casing by means of insulating supports such as 33. A ceramic tip 34 is positioned across one end of casing 30 and secured thereto by being anchored in holes such as 36 and 37 which are bored near the end of said casing. Tip 34 completely covers the end of casing 30 and electrode 31 is securely embedded therein by means of hooked-shaped portion 35 of said electrode. Electrode 31 should be fitted somewhat loosely within tip 34 so as not to work loose due to thermal expansion of said element. Electrical leads 38 and 39 are attached to casing 30 and electrode 31, respectively, to connect the noise element into the electrical circuit of either Figure 1 or Figure 2.

Figure 4:
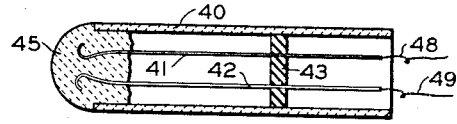

In Figure 4 there is shown a modified form of the transducing element of Figure 3. This arrangement comprises a cylindrically shaped ceramic casing 40 having two metallic electrodes 41 and 42 positioned therein and electrically insulated from said casing and from one another by means of insulating supports such as 43. Both electrodes 41 and 42 are embedded in ceramic tip 45 which is positioned across one end of casing 40; and electrical leads 48 and 49 are attached to electrodes 41 and 42, respectively.

Figure 5:
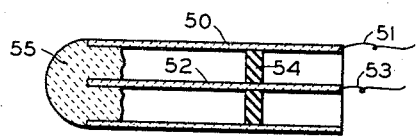

Figure 5 shows a cylindrically shaped ceramic casing 50 enclosing a ceramic rod 52 which is electrically insulated from said casing by means of insulating supports such as 54. Both casing 50 and rod 52 should have a conductivity which is high relative to tip 55. A ceramic tip 55 having rod 52 embedded therein is positioned across one end of casing 50; and electrical leads 51 and 53 are attached to casing 50 and rod 52, respectively.

Figure 6:
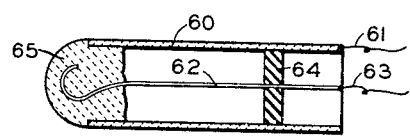

Figure 6 is similar in construction to Figure 5 with the exception that a metallic electrode 62 replaces ceramic rod 52 of Figure 5. Otherwise, casing 60, leads 61 and 63, support 64, and tip 65 are identical to corresponding parts in Figure 5.

Figure 7:
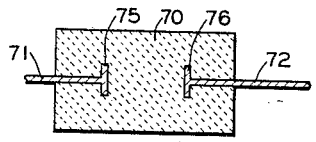

Figure 7 shows a section of ceramic material 70 having two metallic electrodes 71 and 72 embedded therein. Extended portions or disks 75 and 76 either are attached to or made an integral part of electrodes 71 and 72, respectively, in order to secure said electrodes within said ceramic material 70.

In each of the above described Figures 3, 4, 5, 6, and 7, ceramic tips 35, 45, 55, 65, and 70, respectively, act as the electrical noise transducing element. These various tips are formed by adding sufficient water to an appropriate ceramic refractory material in powdered form to make a paste into which are inserted the various electrodes. This paste then is molded and is sintered to form the desired shaped tip. Tips having desired electrical properties have been constructed in the following manner. "Alundum" cement, a material comprising essentially aluminum oxide is combined with small quantities of water glass and water to form a cohesive paste which is sintered to form a hardened tip; a typical composition of said paste being in the proportion of 5 grams of Alundum cement to .2 cubic centimeter of water glass plus sufficient distilled water to make a workable paste. In place of aluminum oxide, various other ceramic refractory materials such as the oxides of calcium, magnesium, zirconium, beryllium, and thorium and the carbides of titanium, zirconium, columbium, tantalum, silicon, tungsten, and hafnium can be used to form satisfactory electrical noise resistance elements. Mixtures of any combination of these oxides and/or carbides also can be employed. While these various ceramic materials normally are considered non-conductive, at elevated temperatures, their electrical conductivity is increased, that is they exhibit a negative coefficient of thermal resistivity, this being particularly true of the above-mentioned oxides. However, even at high temperatures the specific resistances of these materials is considerably higher than that of most metallic conductors. In order to vary the specific resistance of these oxides so as to provide an electrical noise element of given size having a desired ohmic value of resistance, a small percentage of one of the above-mentioned carbides is added to one of the oxides as required to obtain a compound having the desired resistance value. For example, a particular indicating element for use in the circuit of Figure 1 has been constructed having parts by weight of approximately 98 percent aluminum oxide and 2 percent titanium carbide.

The various configurations of electrical noise sensing elements illustrated in Figures 3, 4, 5, 6, and 7 are particularly adapted for a wide range of operating conditions. For example, the probe of Figure 3, which preferably is constructed of a stainless steel casing 30 and chromel wire electrode 31, is effective as a detector of small flames or the measurement of relatively low temperatures. This probe has desirable electrical characteristics since highly conductive metallic electrodes 30 and 31 make direct electrical contact with tip 34. However, this probe cannot be used at very high temperatures which tend to fuse the metallic components. For these high temperatures the element shown in Figure 4 having ceramic casing 40 is more durable, while for extremely high temperatures the probe of Figure 5 is still more durable in that metallic components have been eliminated entirely. The probe type construction of the noise elements shown in Figures 3, 4, 5, and 6 is particularly desirable for making measurements of flames or temperatures in regions not readily accessible, the probe having a form capable of being inserted in said regions through small openings. Insulators 33, 43, 54 and 64 can be omitted if casings 30, 40, 50 and 60 are short. Insulators 33, 43, 54 and 64 can be of any known high electrical resistance material, such as a suitable ceramic, or inorganic fibre material, the material selected depending on the highest temperatures expected at that point, and different materials can be used at different points if desired when there are a plurality of such insulators.

It should be apparent that there has been provided in accordance with this invention electrical noise sensing ceramic elements particularly adapted to the measurement of high temperatures and the detection of flames. While this invention has been described in connection with several preferred embodiments thereof, it should be apparent to those skilled in the art that various modifications as to size, shape and arrangement of parts can be resorted to without departing from the scope of this invention.

I claim:

1. A transducer comprising two opposing spaced electrodes electrically connected to one another by a ceramic tip comprising in parts by weight approximately 98 percent aluminum oxide and approximately 2 percent titanium carbide.

2. A transducer comprising a hollow cylindrically shaped metallic casing open at one end, an elongated metallic electrode positioned axially within and electrically insulated from said casing, and an electrically conductive ceramic tip positioned across said open end of said casing and making electrical contact with said casing and with said electrode, said ceramic tip comprising in parts by weight approximately 98 percent aluminum oxide and approximately 2 percent titanium carbide.

References Cited in the file of this patent

UNITED STATES PATENTS

| | | |
|---|---|---|
| 1,613,877 | Dyckerhoff | Jan. 11, 1927 |
| 1,858,265 | Dahlstrom | May 17, 1932 |
| 2,006,558 | Mueller | July 2, 1935 |
| 2,271,975 | Hall | Feb. 3, 1942 |
| 2,396,196 | Pearson | Mar. 5, 1946 |
| 2,471,732 | Feenberg | May 31, 1949 |
| 2,573,596 | Offner | Oct. 30, 1951 |
| 2,589,157 | Stalhane | Mar. 11, 1952 |

OTHER REFERENCES

Lawson et al.: Physical Review, vol. 70, 2nd series, 1946, pp. 220–221.

Dicke: Review of Scientific Instruments, vol. 17, No. 7, July 1946, pp. 268–275.

Cook et al.: Physical Review, vol. 74, No. 11, December 1, 1948, pp. 1714–1719.

Garrison et al.: Review of Scientific Instruments, vol. 20, No. 11, November 1949, pp. 785–794.